(12) United States Patent  (10) Patent No.: US 7,660,089 B2
Shibata  (45) Date of Patent: Feb. 9, 2010

(54) VOLTAGE RISE SUPPRESSION CIRCUIT AND PANEL TELEVISION

(75) Inventor: Keigo Shibata, Osaka (JP)

(73) Assignee: Funai Electric Co., Ltd., Dalto-shi, Osaka (JP)

( * ) Notice: Subject to any disclaimer, the term of this patent is extended or adjusted under 35 U.S.C. 154(b) by 471 days.

(21) Appl. No.: 11/787,914

(22) Filed: Apr. 18, 2007

(65) Prior Publication Data

US 2007/0247775 A1 Oct. 25, 2007

(30) Foreign Application Priority Data

Apr. 19, 2006 (JP) ............................. 2006-002951

(51) Int. Cl.
    *H02H 3/20* (2006.01)
    *H02H 3/24* (2006.01)
(52) U.S. Cl. .......................... 361/91.1; 361/71; 361/73; 361/90; 361/92
(58) Field of Classification Search ................... 361/71, 361/73, 90, 91, 1, 92
See application file for complete search history.

(56) References Cited

U.S. PATENT DOCUMENTS

| | | | | |
|---|---|---|---|---|
| 3,311,907 A | * | 3/1967 | Teal | ........................... 340/662 |
| 3,820,099 A | * | 6/1974 | Vogt | ........................... 340/662 |
| 4,685,020 A | * | 8/1987 | Driscoll et al. | ................. 361/18 |
| 5,319,514 A | * | 6/1994 | Walsh et al. | ................... 361/59 |
| 5,914,865 A | * | 6/1999 | Barbehenn et al. | ........ 363/21.15 |
| 6,972,940 B2 | * | 12/2005 | Tsukasaki et al. | ............. 361/90 |
| 7,280,331 B2 | * | 10/2007 | Samodell | ..................... 361/90 |
| 7,525,780 B2 | * | 4/2009 | Okamatsu | ..................... 361/90 |

FOREIGN PATENT DOCUMENTS

| | | |
|---|---|---|
| JP | 05-300739 | 11/1993 |
| JP | 11-122915 | 4/1999 |
| JP | 11-127401 | 5/1999 |
| JP | 2000-116028 | 4/2000 |

* cited by examiner

*Primary Examiner*—Stephen W Jackson
*Assistant Examiner*—Scott Bauer
(74) *Attorney, Agent, or Firm*—Yokoi & Co., U.S. A., Inc.; Peter Ganjian (57) ABSTRACT

Included are a Zener diode D2 having a cathode connected onto a voltage output line, dividing resistors having one terminal connected to the anode of the Zener diode D2 and having the other terminal grounded, a transistor Q1 having a base connected to the junction point between the dividing resistors via a resistor and having an emitter grounded, a transistor Q2 having a base connected to the junction point between the dividing resistors and having an emitter grounded, and a microcomputer having an undervoltage detection terminal 10a which is connected to the collector of the transistor Q1 and to which 3.3 V is externally applied and a power supply terminal 10b which is connected to the collector of the transistor Q2 and via which a P-ON-H signal of 3.3 V that starts a power supply circuit 126 when the power supply is turned on is transmitted.

5 Claims, 10 Drawing Sheets

PRIOR ART

FIG. 7

PRIOR ART

FIG. 8

PRIOR ART

FIG. 9

PRIOR ART

FIG. 10

PRIOR ART

US 7,660,089 B2

VOLTAGE RISE SUPPRESSION CIRCUIT AND PANEL TELEVISION

CROSS-REFERENCES TO RELATED APPLICATIONS

The present application is related to the Japanese Utility Model Application No. 2006-002951 filed Apr. 19, 2006, the entire disclosure of which is expressly incorporated by reference herein.

BACKGROUND OF THE INVENTION

1. Field of the Invention

The present invention relates to a voltage rise suppression circuit and a panel television or especially a panel television to which the voltage rise suppression circuit is adapted.

2. Description of the Related Art

In a power supply circuit that supplies a predetermined supply voltage using a transformer, a secondary voltage to be placed on a voltage output line is fed back in order to control a primary voltage. This kind of circuit includes an overvoltage protection circuit or an undervoltage protection circuit for the purpose of protecting the circuit from an abnormal voltage.

Figure 5:
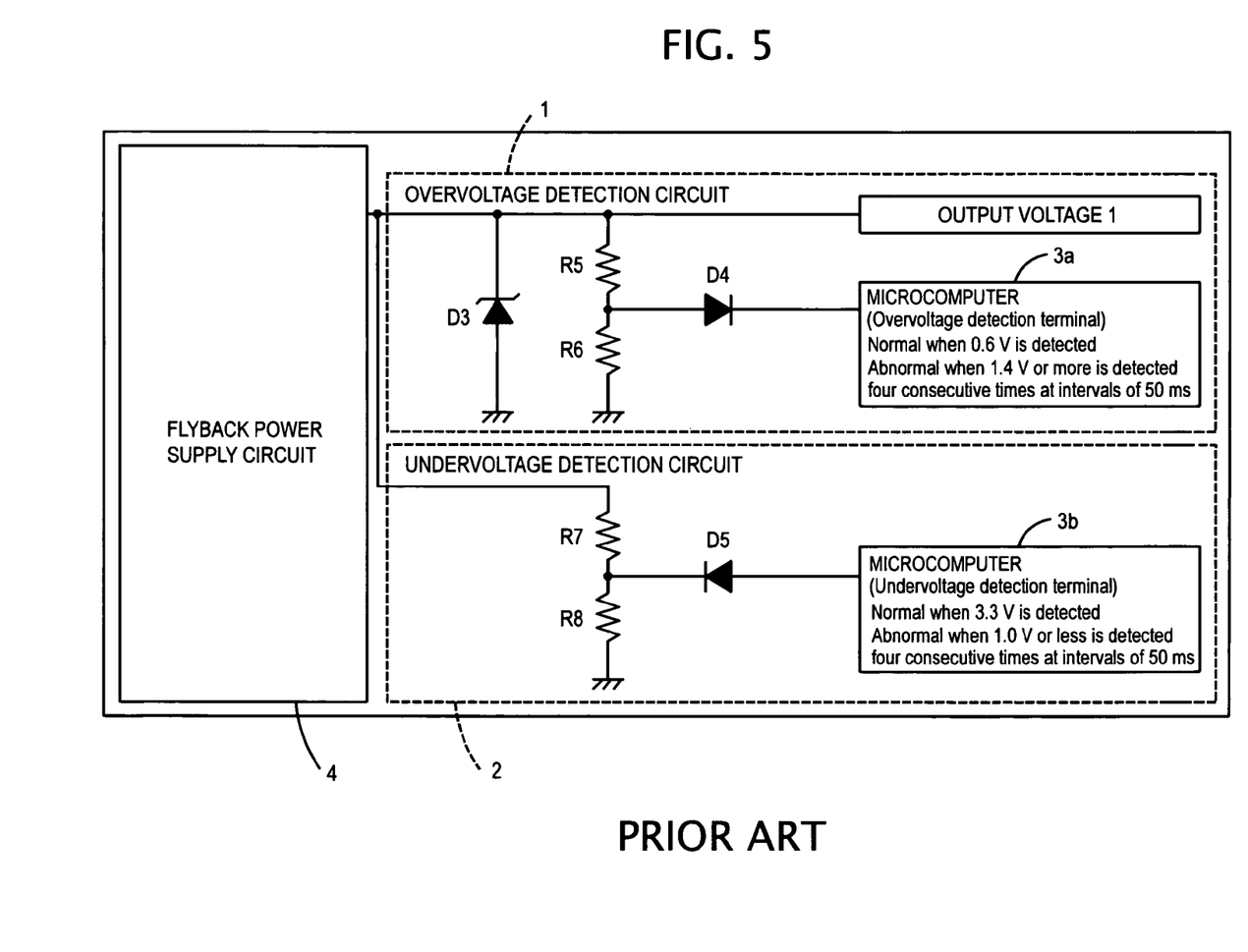
FIG. 5 is a block diagram showing a conventional overvoltage detection circuit and an undervoltage detection circuit.
Figure 6:
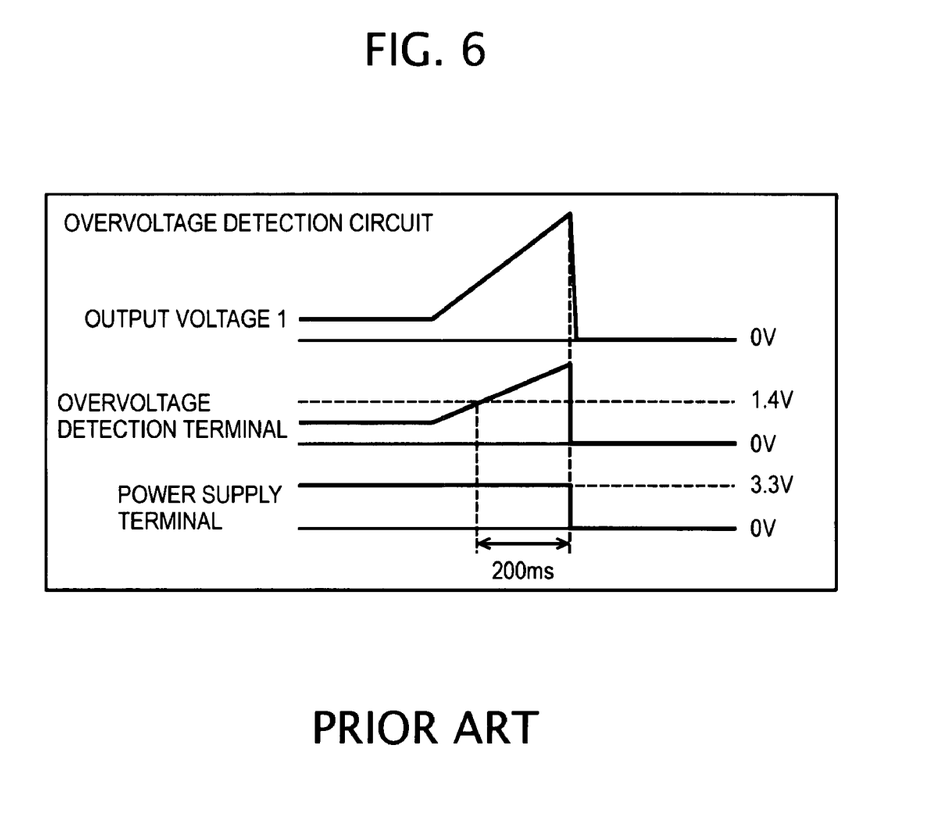
FIG. 6 is a timing chart showing relative timings observed when the overvoltage detection circuit shown in FIG. 5 has detected an overvoltage.
Figure 7:
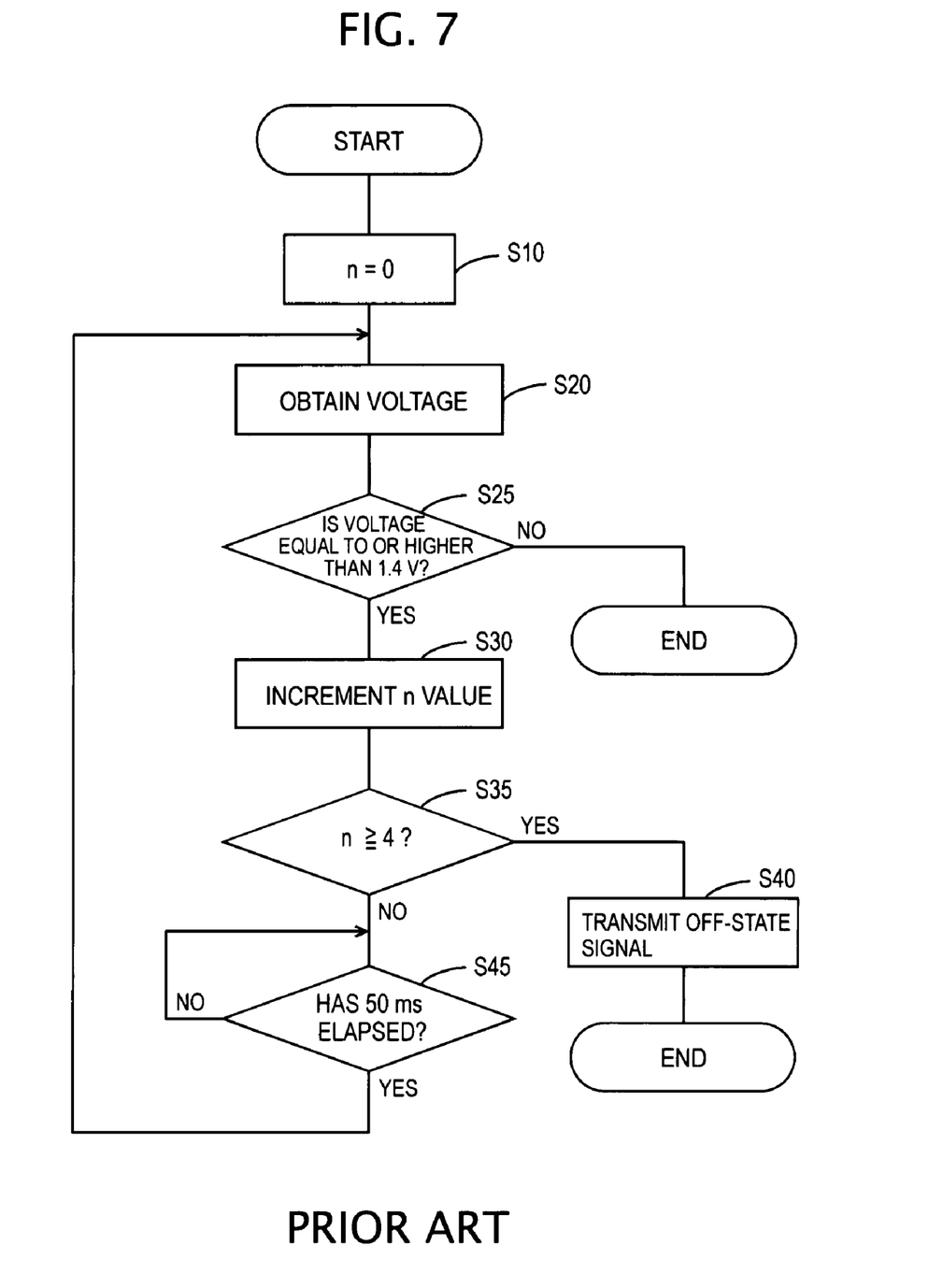
FIG. 7 is a flowchart describing a process which a microcomputer follows for controlling the relative timings shown in the timing chart of FIG. 6.
Figure 8:
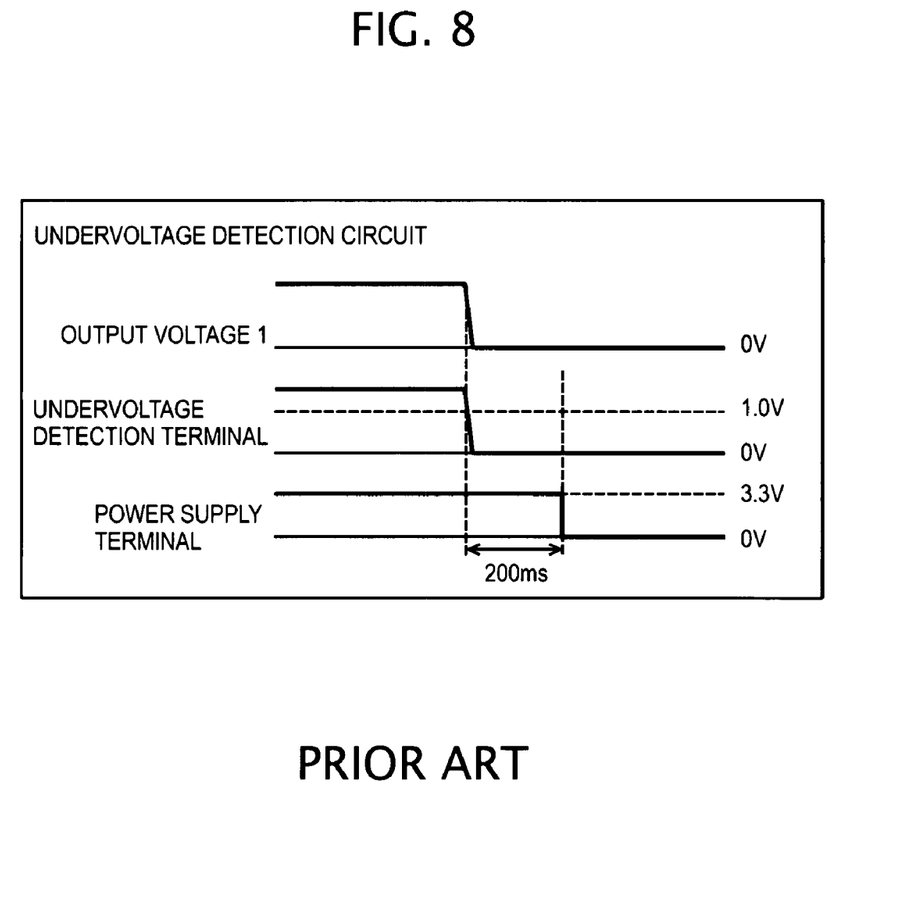
FIG. 8 is a timing chart showing relative timings observed when the undervoltage detection circuit shown in FIG. 5 has detected an undervoltage.

Referring to FIG. 5 to FIG. 9, a conventionally employed overvoltage protection circuit and undervoltage protection circuit will be described below. FIG. 5 is a block diagram showing a conventional overvoltage detection circuit and undervoltage detection circuit. FIG. 6 is a timing chart showing relative timings observed when the overvoltage detection circuit shown in FIG. 5 has detected an abnormality. FIG. 7 is a flowchart describing a process which a microcomputer follows for controlling the timings shown in the timing chart of FIG. 6. FIG. 8 is a timing chart showing relative timings observed when the undervoltage detection circuit shown in FIG. 5 has detected an abnormality.

Referring to FIG. 5, an overvoltage detection circuit 1 generally includes: a short-circuiting Zener diode D3 having a cathode thereof connected onto an output line of a power supply circuit 4 and having an anode thereof grounded; dividing resistors R5 and R6 having one terminal thereof connected onto the output line of the power supply circuit 4 and having the other terminal thereof grounded; a diode D4 having an anode thereof connected to a junction point between the dividing resistors; and a microcomputer having an overvoltage detection terminal thereof 3a connected to the cathode of the diode D4.

In FIG. 5, an output voltage 1 has a fraction thereof developed by the dividing resistors R5 and R6. After the voltage at the junction point is thus dropped, the resultant voltage is applied to the anode of the diode D4. The diode D4 transfers the voltage at the junction point to the overvoltage detection terminal 3a of the microcomputer. The dividing resistors are adjusted so that, for example, when the power supply circuit 4 operates normally, the voltage at the junction point will be 0.6 V. The voltage of 0.6 V is also applied to the overvoltage detection terminal 3a. On the other hand, when the power supply circuit 4 operates abnormally, the output voltage 1 rises, and the voltage at the junction point rises accordingly. Consequently, the voltage applied to the overvoltage detection terminal 3a rises. Moreover, even when the voltage at the junction point gets lower than it is normally, the diode D4 rectifies the voltage for fear an abnormal voltage may be applied to the overvoltage detection terminal 3a.

Referring to the flowchart of FIG. 7 and the timing chart of FIG. 6, a process to be followed when the microcomputer detects an overvoltage will be described below. The process is such that while the microcomputer monitors the output line, on which the output voltage 1 is placed, via the overvoltage detection terminal 3a, if the voltage applied to the overvoltage detection terminal 3a exceeds 1.4 V, the microcomputer senses the overvoltage and decides whether the overvoltage is attributable to an abnormality in the power supply circuit 4. The process is repeatedly executed while the power supply is on.

When the process is initiated, the microcomputer resets a counter to 0 at step S10 and proceeds to step S20. At step S20, the microcomputer obtains a voltage applied to the overvoltage voltage detection terminal 3a. At step S25, the microcomputer decides whether the voltage obtained at step S20 is equal to or higher than 1.4 V. Unless the voltage exceeds 1.4 V, the microcomputer considers that there is no problem and terminates the process. A conceivable cause of a temporarily rise in a voltage is noise or the like. In contrast, if a voltage equal to or higher than 1.4 V is detected, control is passed to step S30.

At step S30, the counter value is incremented. At step S35, the counter value is checked to see if it is equal to or larger than 4. If the counter value falls below 4, a condition is unmet. Consequently, control is passed to step S45. On the other hand, if the counter value is equal to or larger than 4, that is, if 200 ms has elapsed since a voltage equal to or higher than 1.4 V is detected at the overvoltage detection terminal 3a for the first time, the condition is met and control is passed to step S40. The microcomputer transmits an off-state signal to the power supply circuit 4 so as to stop the power supply circuit 4, and then terminates the process. An overvoltage is detected four consecutive times at intervals of 50 ms after it is detected for the first time. This is intended to prevent malfunction derived from noise or the like.

At step S45, a decision is made on whether 50 ms has elapsed since a voltage exceeding 1.4 V is detected at step S25. If 50 ms has not elapsed, a decision is made at step S45. After 50 ms has elapsed, the process beginning with step S20 is repeated.

Referring to FIG. 5, an undervoltage detection circuit 2 generally includes: dividing resistors R7 and R8 having one terminal thereof connected onto the output line of the power circuit 4 and having the other terminal thereof grounded; a diode D5 having a cathode thereof connected to the junction point between the dividing resistors; and a microcomputer having an undervoltage detection terminal 3b thereof connected to the anode of the diode D5.

In FIG. 5, the output voltage 1 has a fraction thereof developed by the dividing resistors R7 and R8. The voltage at the junction point is thus dropped and then applied to the cathode of the diode D5. The diode D5 transfers the voltage at the junction point to the undervoltage detection terminal 3b of the microcomputer. The dividing resistors are adjusted so that for example, when the power supply circuit 4 operates normally, the voltage at the junction point will be 3.3 V. The voltage of 3.3 V is also applied to the undervoltage detection terminal 3b. On the other hand, when the power supply circuit 4 operates abnormally, the output voltage 1 drops. The voltage at the junction point drops accordingly. This causes the voltage to be applied to the undervoltage detection terminal 3b to drop. Moreover, the diode D5 rectifies the voltage for fear an abnormal voltage may be applied to the undervoltage detection terminal 3b in case the voltage at the junction point gets higher than it normally is.

Figure 9:
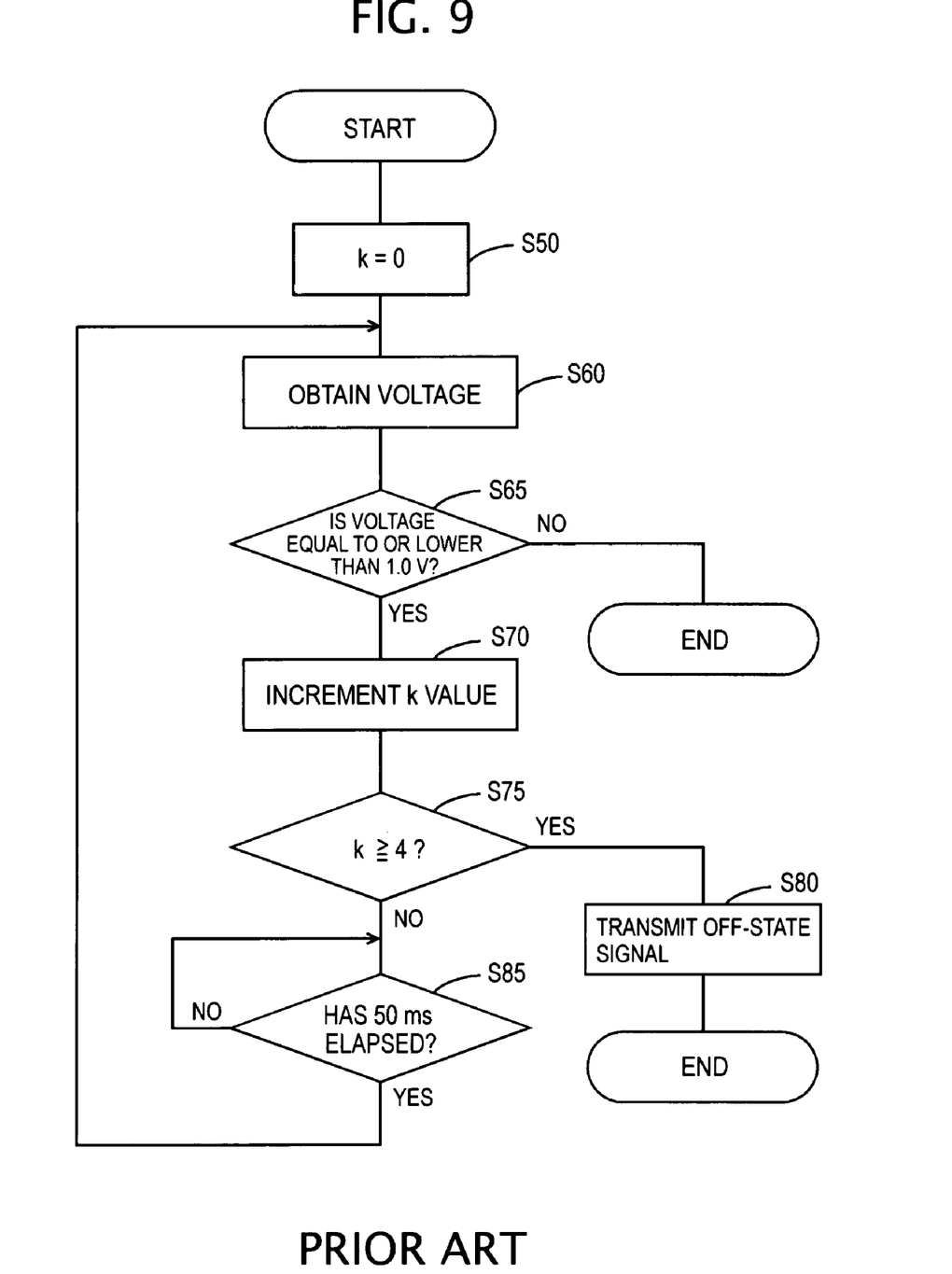
FIG. 9 is a flowchart describing a process which the microcomputer follows for controlling the relative timings shown in the timing chart of FIG. 8.

Referring to the flowchart of FIG. 9 and the timing chart of FIG. 8, a process to be followed when the microcomputer detects an undervoltage will be described below. The process is such that while the microcomputer monitors the output line, on which the output voltage 1 is placed, via the undervoltage detection terminal 3b, if the voltage applied to the undervoltage detection terminal 3b falls below 1.0 V, the microcomputer senses the undervoltage and decides whether the undervoltage is attributable to an abnormality in the power supply circuit 4. The process is repeatedly executed while the power supply is on.

When the process is initiated, the microcomputer resets the counter to 0 at step S50 and proceeds to step S60. At step S60, the microcomputer obtains a voltage applied to the undervoltage detection terminal 3b. At step S65, the microcomputer decides whether the voltage obtained at step S60 is equal to or lower than 1.0 V. Unless the voltage is lower than 1.0 V, the microcomputer considers that there is no problem and terminates undervoltage discrimination. A conceivable cause of a temporarily drop in a voltage is noise or the like. In contrast, if a voltage equal to or smaller than 1.0 V is detected again, control is passed to step S70.

At step S70, the counter value is incremented. At step S75, the counter value is checked to see if it is equal to or larger than 4. If the counter value falls below 4, a condition is unmet and control is passed to step S85. On the other hand, if the counter value is equal to or larger than 4, that is, if 200 ms has elapsed since the voltage equal to or lower than 1.0 V is detected at the undervoltage detection terminal 3b for the first time, the condition is met and control is passed to step S80. The microcomputer transmits an off-state signal to the power supply circuit 4 so as to stop the power supply circuit 4, and terminates the process. An undervoltage is detected four consecutive times at intervals of 50 ms after it is detected for the first time. This is intended to prevent malfunction derived from noise.

At step S85, a decision is made on whether 50 ms has elapsed since a voltage lower than 1.0 V is detected previously at step S65. If 50 ms has not elapsed, the decision is made again at step S85. After 50 ms has elapsed, the process beginning with step S60 is repeated.

Japanese Unexamined Patent Application Publication No. 11-127401 describes that: a secondary voltage or an output voltage of a switching power supply circuit is transferred to a microcomputer; the number of output lines of a counter circuit included in the microcomputer is two; a latching circuit is connected onto one of the output lines; and the output lines are led to an AND circuit. Herein, incorrect discrimination made by the counter circuit during a period during which the latching circuit holds a counter value is discarded. Thus, if the intermittent oscillation of the switching power supply circuit persists due to a current limiting circuit action, the stoppage of the switching power supply circuit derived from malfunction of an intermittent oscillation detection circuit is avoided.

Figure 10:
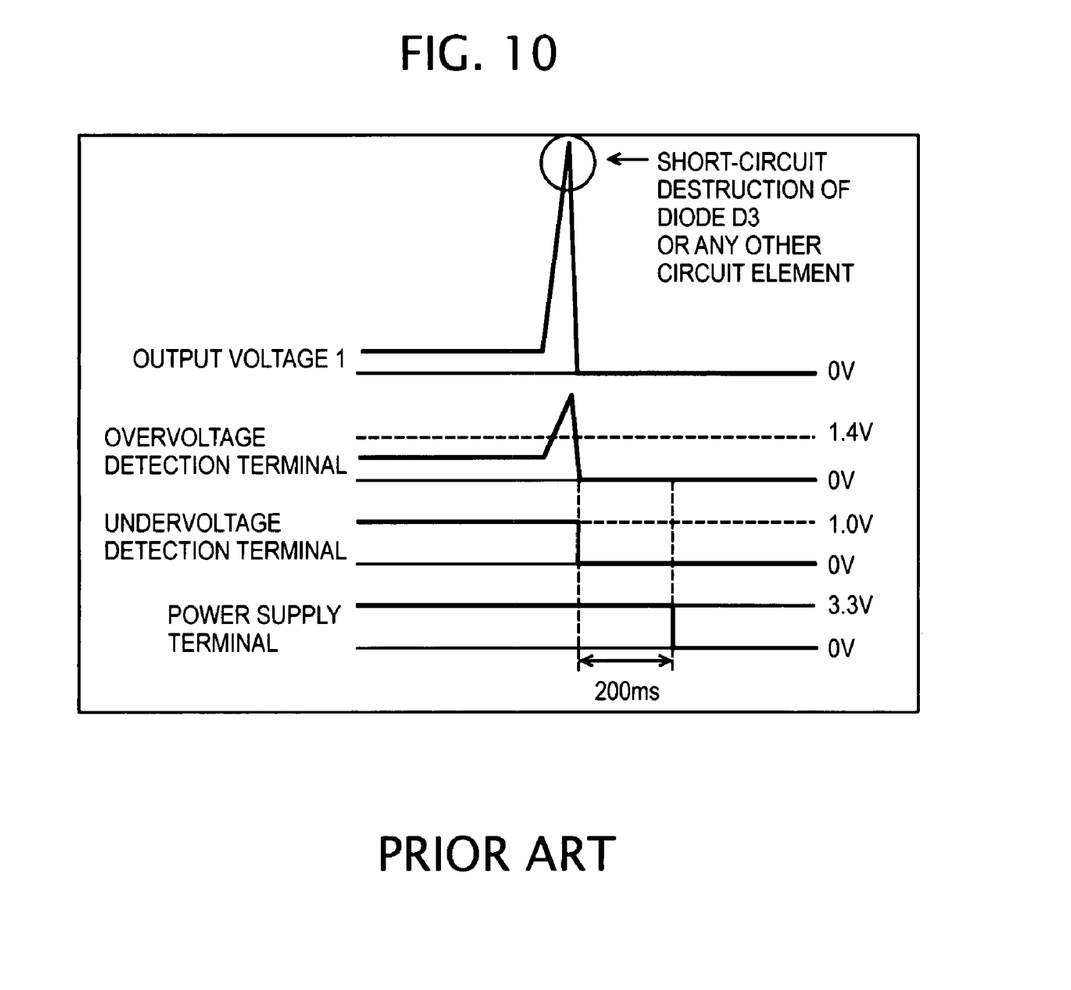
FIG. 10 is a timing chart showing relative timings observed when an abrupt voltage rise has occurred in the circuitry shown in FIG. 5.

In the foregoing conventional overvoltage detection circuit 1 and undervoltage detection circuit 2, as seen from the timing chart of FIG. 10, if an abrupt voltage rise occurs, an overcurrent flows into the circuit until the microcomputer detects the voltage rise. The Zener diode D3 or any other circuit element may be short-circuited and destroyed. If short-circuit destruction occurs, a voltage drops. The undervoltage detection circuit 2 detects the voltage drop, and turns off the power supply.

As far as a flap display panel (FDP) composed of multiple substrates is concerned, the substrates other than a power supply substrate may be broken. If many substrates are broken or whichever of the substrates is broken is unknown, it takes much time to complete inspection or repair. Moreover, if an FDP composed of substrates is purchased from a manufacturer for use, the FDP has to be entirely replaced with a new one.

BRIEF SUMMARY OF THE INVENTION

The present invention discloses a voltage rise suppression circuit and a panel television capable of confining an abruptly rising voltage to a certain voltage, informing a microcomputer of an abnormality, and safely turning off the power supply.

One aspect of the present invention provides a voltage rise suppression circuit that suppresses an excessive rise in an output voltage by monitoring a voltage output line of a flyback power supply circuit. The voltage rise suppression circuit includes: a Zener diode having a cathode thereof connected onto the voltage output line and undergoing a Zener breakdown when an output on the voltage output line exceeds a predetermined value; dividing resistors having one terminal thereof connected to the anode of the Zener diode and having the other terminal thereof grounded; a first transistor having a base thereof connected to the junction point between the dividing resistors and having an emitter thereof grounded; an undervoltage detection terminal connected to the collector of the first transistor; a power supply terminal via which a voltage signal that starts the power supply circuit is transmitted; a second transistor having a base thereof connected to the junction point between the dividing resistors, having an emitter thereof grounded, and having a collector thereof connected to the power supply terminal; and a voltage rise suppression unit that controls the power supply terminal according to the voltage at the undervoltage detection terminal.

When an output voltage rises, a Zener current flows through the Zener diode, and a voltage is developed at the intermediate tap. The voltage is applied to the bases of the first and second transistors respectively, whereby the first and second transistors are turned on. Accordingly, the voltage at the undervoltage detection terminal is brought to 0 V (ground level). At the same time, a voltage signal (on-state signal) sent via the power supply terminal is brought to 0 V (ground level) via the emitter of the second transistor. Consequently, the power supply circuit stops, and an output voltage drops.

When the output voltage drops to fall within a normal range, the Zener current does not flow through the Zener diode any longer. The first and second transistors are therefore turned off, and the undervoltage detection terminal and power supply terminal are not grounded. Consequently, the voltage signal (on-state signal) sent via the power supply terminal reaches the power supply circuit. This causes the power supply circuit to resume generating an output. The drop in the output voltage is ceased. If the output voltage further rises, the aforesaid process is repeated. During the process, the voltage rise suppression unit monitors the voltage at the undervoltage detection terminal, and controls the power supply terminal on the basis of the detected voltage. The voltage rise suppression unit ceases the transmission of the voltage signal to the power supply circuit so as to suppress the rise in the voltage generated by the power supply circuit.

An optional aspect of the present invention provides a voltage rise suppression circuit capable of safely turning off the power supply while confining an abruptly rising voltage to a certain voltage in case a power supply circuit operates abnormally. The incorporation of the circuit prevents breakage of circuit elements on any substrate other than a power supply circuit substrate, and facilitates inspection or repair. Moreover, only one terminal is needed in place of two kinds of terminals, that is, an overvoltage sensing terminal and an undervoltage sensing terminal which have been required in the past. This results in simple circuitry and easy design or manufacture.

Another aspect of the present invention provides the voltage output line is a line to which a feedback line led to the power supply circuit is coupled.

An abnormality such as an excessive rise or drop in an output of the power supply circuit is likely to occur in case feedback control becomes abnormal. Therefore, if the voltage output line is a line to which the feedback line is coupled, an abnormality in the output of the power supply circuit can be readily detected.

Another aspect of the present invention provides the voltage rise suppression unit senses a drop in a voltage applied to the undervoltage detection terminal and controls a signal to be transmitted via the power supply terminal.

Specifically, what is sensed by the voltage rise suppression unit is a drop in the voltage at the undervoltage detection terminal. Consequently, a voltage rise suppression circuit capable of more efficiently detecting an abnormality in an output of the power supply circuit can be provided.

One aspect of the present invention provides a panel television includes a voltage rise suppression circuit that suppresses an excessive rise in an output voltage under the control of a microcomputer which monitors a voltage output line of a flyback power supply circuit. The panel television displays a picture on a flat panel display according to a television signal while being supplied a supply voltage from the power supply circuit. The power supply circuit is controlled based on a feedback signal to be fed back over the voltage output line. The voltage rise suppression circuit includes: a first Zener diode having a cathode thereof connected onto the voltage output line and having an anode grounded; a second Zener diode having a cathode connected onto the voltage output line; dividing resistors having one terminal thereof connected to the anode of the second Zener diode and having the other terminal thereof grounded; a first transistor having a base thereof connected to the junction point between the dividing resistors via a first resistor and having an emitter thereof grounded; a second transistor having a base thereof connected to the junction point between the dividing resistors via a second resistor and having an emitter thereof grounded; and a microcomputer having an undervoltage detection terminal which is connected to the collector of the first transistor and to which a fixed voltage is applied externally, and a power supply terminal which is connected to the collector of the second transistor and via which a P-ON-H signal that starts the power supply circuit when the power supply is turned on is transmitted. When an output voltage rises, a Zener current flows through the second Zener diode. A voltage is developed at the intermediate tap, and the voltage is applied to the bases of the first and second transistors respectively. Consequently, the first and second transistors are turned on. The voltage at the undervoltage detection terminal is routed to a ground, and the P-ON-H signal to be sent to the power supply circuit via the power supply terminal is routed to a ground. The power supply circuit stops, and the output voltage drops. When the output voltage drops to fall within a normal range, the Zener current does not flow through the second Zener diode any longer. Consequently, the first and second transistors are turned off, and the undervoltage detection terminal and power supply terminal are not grounded any longer. The P-ON-H signal sent via the power supply terminal reaches the power supply circuit, thus starting the power supply circuit. The microcomputer obtains the voltage at the undervoltage detection terminal at intervals of a predetermined number of times. If a voltage of a predetermined voltage or less is detected four consecutive times, the transmission of the P-ON-H signal via the power supply terminal is ceased.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Embodiments of the present invention will be described according to the following sequence:

(1) Outline configuration of a panel television (2) Configuration of a voltage rise suppression circuit (3) Process which a microcomputer follows for suppressing a voltage rise (4) Conclusion

(1) OUTLINE CONFIGURATION OF A PANEL TELEVISION

Figure 1:
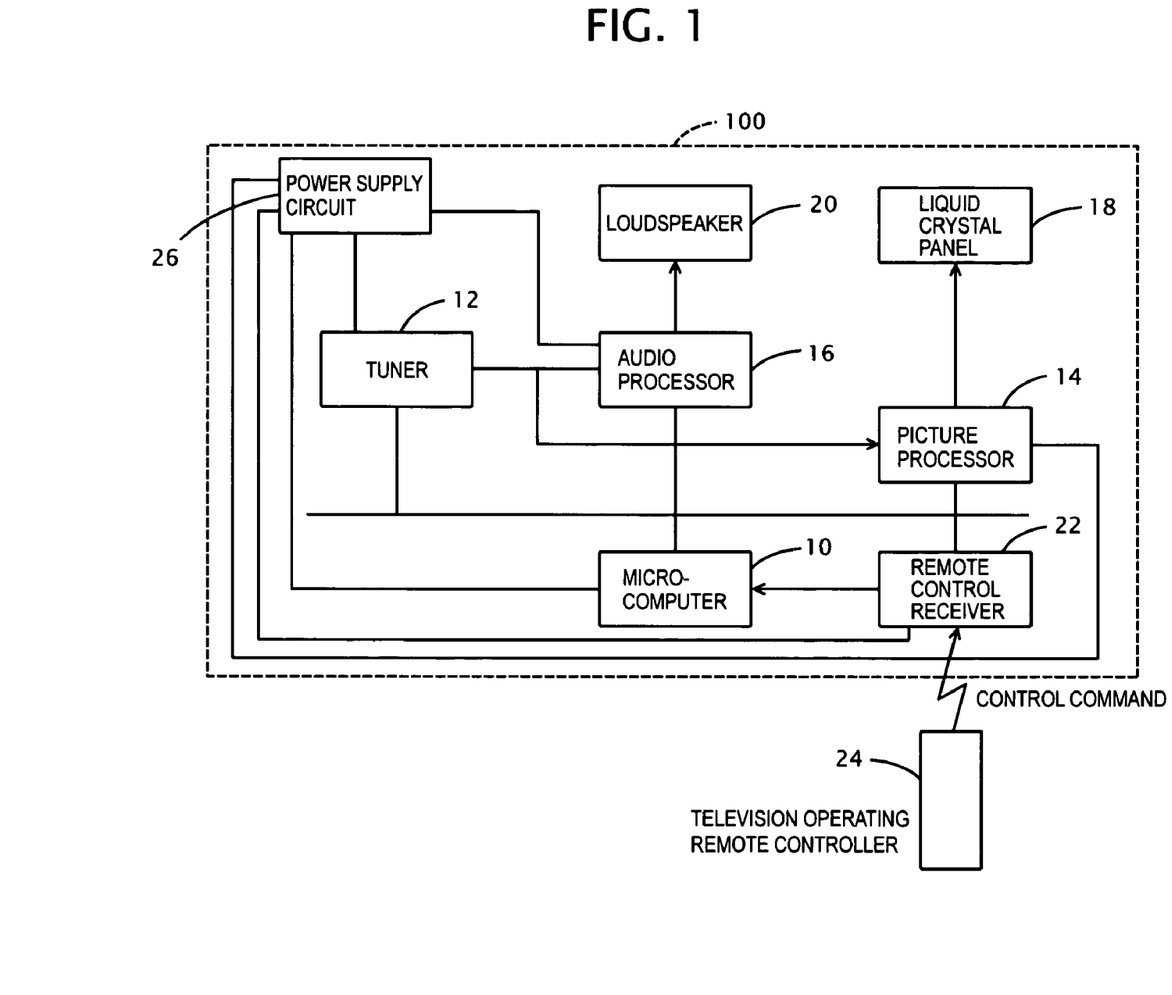
FIG. 1 is a schematic block diagram of a liquid crystal television including a voltage rise suppression circuit in accordance with the first embodiment of the present invention.

The first embodiment of the present invention will be described with reference to drawings. FIG. 1 is a schematic block diagram showing a liquid crystal television as an example of a panel television to which a supply voltage is supplied through a voltage rise suppression circuit in accordance with the present invention and which displays a picture on a flat panel display according to a television signal.

In FIG. 1, a liquid crystal television 100 includes: a microcomputer 10 that controls actions to be performed in the television; a tuner 12 that samples a television signal of a selected channel from a television signal received via an antenna that is not shown, and that transmits the sampled television signal; a picture processor 14 that displays a picture on a liquid crystal panel 18 according to the television signal sent from the tuner 12; an audio processor 16 that radiates sounds via a loudspeaker 20 according to the television signal sent from the tuner; and a remote-control receiver 22 that receives an operating command sent from a remote controller 24.

The microcomputer 10 controls a power supply circuit 26 by transmitting an on-state or off-state signal via a power supply terminal 10b while monitoring an undervoltage detection terminal 10a that will be described later, or controls switching of channels or increasing or decreasing of the volume in response to a control command received by the remote-control receiver 22. The power supply circuit 26 is a flyback power supply circuit, externally receives a mains voltage (for example, AC 100 V), generates various voltages, and supplies operating supply voltages to the respective components of the liquid crystal television 100.

(2) CONFIGURATION OF A VOLTAGE RISE SUPPRESSION CIRCUIT

Figure 2:
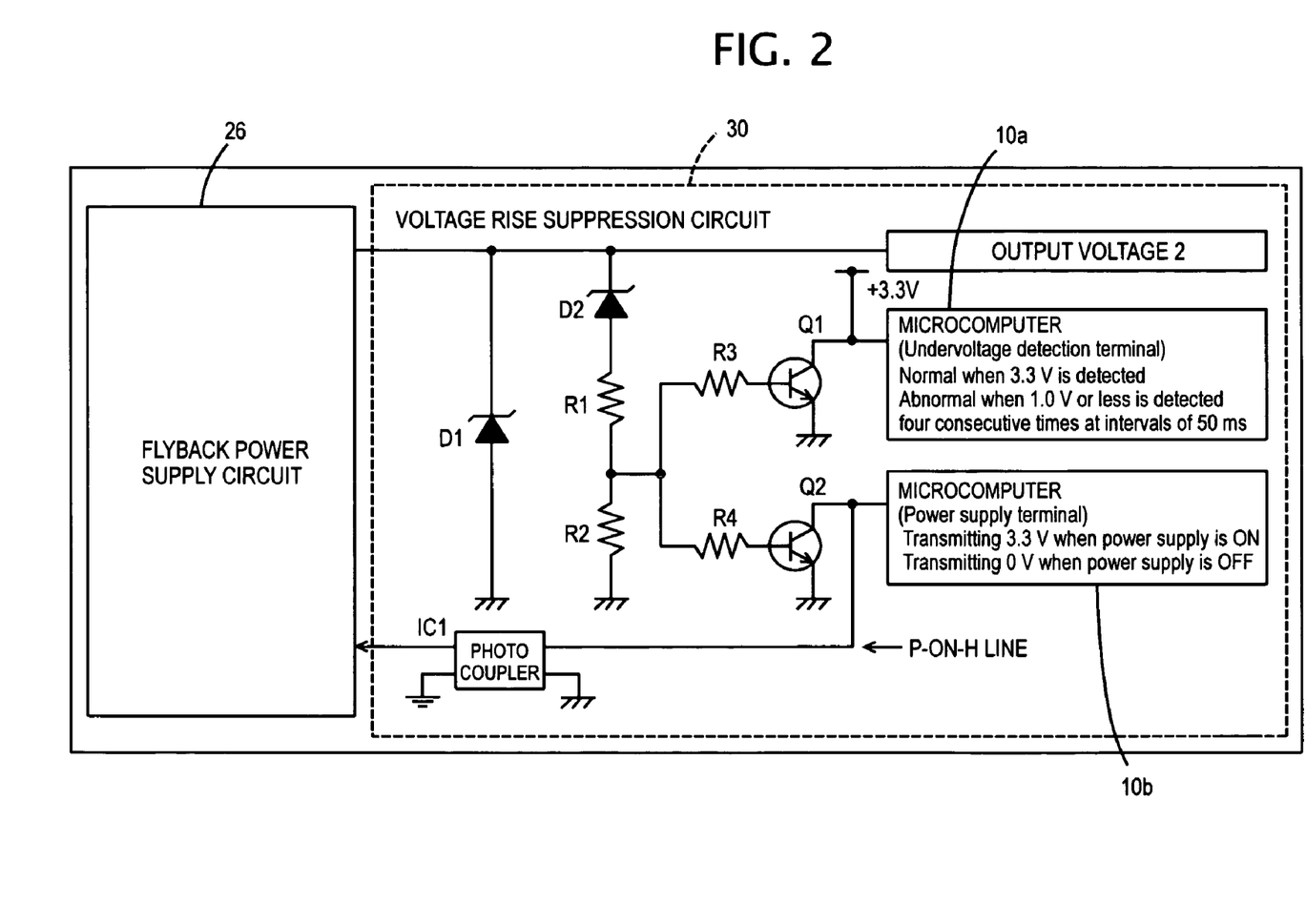
FIG. 2 is a block diagram of the voltage rise suppression circuit in accordance with the first embodiment of the present invention.
Figure 3:
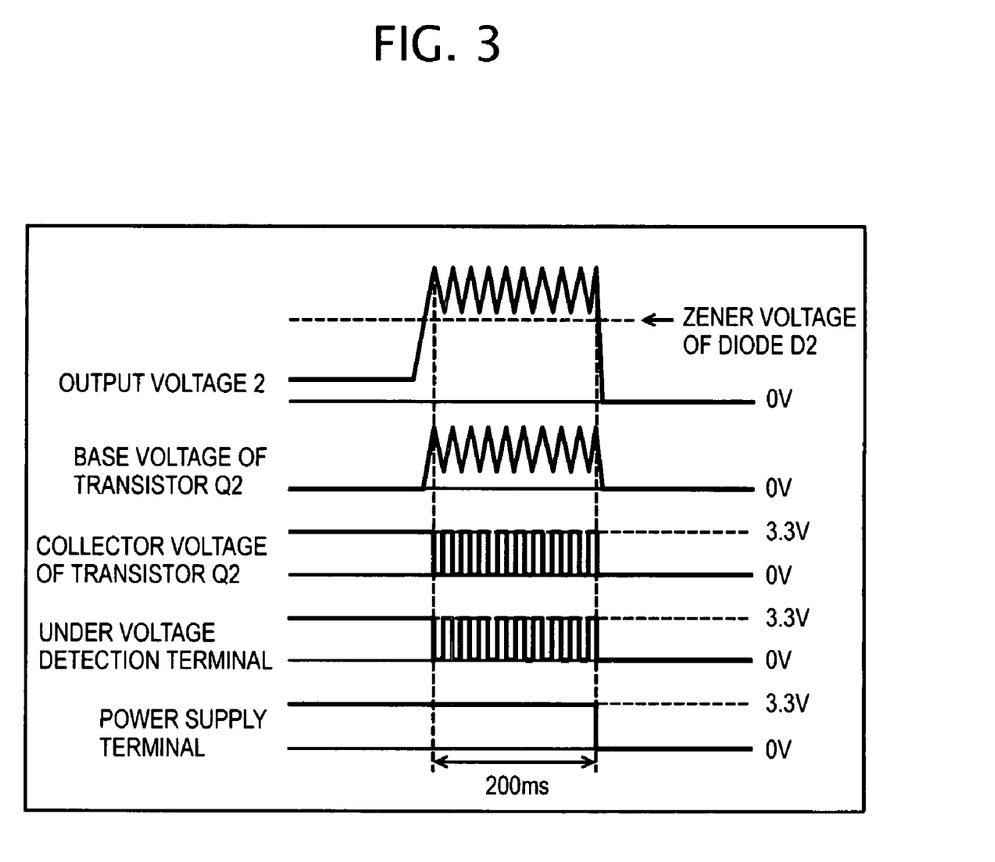
FIG. 3 is a timing chart showing relative timings observed when the voltage rise suppression circuit in accordance with the first embodiment of the present invention copes with an abnormality.

FIG. 2 is a block diagram of a voltage rise suppression circuit 30 in accordance with the present invention. FIG. 3 is a timing chart showing relative timings observed when the voltage rise suppression circuit 30 in accordance with the present invention copes with an abnormality. Referring to FIG. 2, a voltage to be generated by the power supply circuit 26 is shown to be an output voltage 2 alone. Needless to say, the power supply circuit 26 generates other various voltages and supplies the voltages to the respective components of the liquid crystal television 100 over multiple lines. The voltage rise suppression circuit 30 may be constructed in association with any of the multiple lines or a combination of any lines. Since an abnormality in the power supply circuit is often attributable to feedback control, the voltage output line on which the output voltage 2 is placed should preferably be a line over which a feedback signal is fed back in order to control a primary voltage for the purpose of keeping the output voltage of the power supply circuit 26 constant.

In FIG. 2, the voltage rise suppression circuit 30 generally includes a Zener diode D1, a Zener diode D2, dividing resistors that are resistors R1 and R2, a first transistor Q1, a second transistor Q2, a resistor R3, a resistor R4, and a microcomputer 10 having an undervoltage detection terminal 10a and a power supply terminal 10b.

In the foregoing circuitry, the Zener diode D1 has a cathode thereof connected onto a voltage output line on which the output voltage 2 is placed and has an anode thereof grounded. When the output on the voltage output line falls below a predetermined value, no current flows. When the output on the voltage output line exceeds the predetermined value, a Zener breakdown occurs to cause a back current to flow. Eventually, a voltage is routed to a ground. Thus, the Zener diode D1 fills the role of a protective diode that keeps the output voltage 2 constant. As the predetermined value, various values are adoptable and any of the various values is selected based on an appropriate value of the output voltage 2.

The Zener diode D2 has a cathode thereof connected on the voltage output line and has an anode thereof connected to one terminal of the dividing resistors. When the output on the voltage output line falls below a predetermined value, no current flows. When the output on the voltage output line exceeds the predetermined value a Zener breakdown occurs to cause a back current to flow. The predetermined value for the Zener diode D2 is determined based on the appropriate value of the output voltage 2 and the predetermined value for the Zener diode D1.

The resistors R1 and R2 serve as the dividing resistors. The dividing resistors has one terminal thereof connected to the anode of the Zener diode D2 and has the other terminal thereof grounded. The resistances of the resistors R1 and R2 can be appropriately modified according to a voltage value that should be developed at the junction point between the resistors.

The first transistor Q1 has a base thereof connected to the junction point between the dividing resistors via the resistor R3, has an emitter thereof grounded, and a collector thereof connected to the undervoltage detection terminal 10a of the microcomputer 10. When the output voltage 2 rises, if a Zener breakdown occurs in the Zener diode D2, a voltage is applied to the base of the first transistor Q1. Consequently, the first transistor Q1 is turned on and the undervoltage detection terminal 10a is grounded.

The second transistor Q2 has a base thereof connected to the junction point between the dividing resistors, has an emitter thereof grounded, and has a collector thereof connected to the power supply terminal 10b of the microcomputer 10. When the output voltage 2 rises, if a Zener breakdown occurs in the Zener diode D2, a voltage is applied to the base of the second transistor Q2. Consequently, the second transistor Q2 is turned on and the power supply terminal 10b is grounded.

The microcomputer 10 has the undervoltage detection terminal 10a connected to the collector of the first transistor Q1 and has the power supply terminal 10b connected to the collector of the second transistor Q1. The power supply terminal 10b is connected onto a P-ON-H line by way of which an on-state or off-state signal is placed on a feedback line led to the power supply circuit 26. A P-ON-H signal that is a voltage signal which starts the power supply circuit 26 when the power supply is turned on is transmitted via the power supply terminal 10b. Herein, the P-ON-H line is led to a primary winding in the power supply circuit 26 via a photocoupler IC1. A signal to be fed back in order to control a primary voltage or a signal that starts or stops the power supply circuit 26 according to whether the power supply of the liquid crystal television 100 is turned on or off is transmitted over the P-ON-H line.

When the power supply circuit 26 operates normally, 3.3 V is applied to the undervoltage detection terminal 10a, and 3.3 V is transmitted via the power supply terminal 10b. With a rise in the output voltage 2 of the power supply circuit 26, the first transistor Q1 and second transistor Q2 are turned on. The voltage is routed to the emitters. Consequently, the undervoltage detection terminal 10a is, grounded and the voltage at the undervoltage detection terminal 10a is brought to 0 V. A P-ON-H signal transmitted via the power supply terminal 10b is not transferred to the photocoupler IC1 but is transferred to a ground via the emitter of the second transistor Q2.

Specifically, as shown in FIG. 3, when the output voltage 2 rises, a Zener current flows through the Zener diode D2. A voltage is developed at the junction point. The voltage is applied to the bases of the first and second transistors Q1 and Q2 respectively. Consequently, the first and second transistors Q1 and Q2 are turned on. The voltage at the undervoltage detection terminal 10a is brought to 0 V. At the same time, the P-ON-H signal (signal signifying that the power supply is turned on) to be sent to the primary winding in the power supply circuit 26 via the power supply terminal over the P-ON-H line is brought to 0 V via the emitter of the second transistor Q2. Consequently, the P-ON-H signal does not reach the primary winding in the power supply circuit 26. The primary winding is de-energized, and the output voltage 2 drops. When the output voltage 2 drops to fall within a normal range, the Zener current does not flow through the Zener diode D2 any longer. Consequently, the first and second transistors Q1 and Q2 are turned off. The voltages at the undervoltage detection terminal 10a and power supply terminal 10b are restored to 3.3 V. Consequently, the P-ON-H signal sent via the power supply terminal 10b reaches the primary winding in the power supply circuit 26. Consequently, the primary winding in the power supply circuit 26 resumes carrying a current, and the drop in the output voltage 2 ceases. If the output voltage 2 further rises, the foregoing process is repeated. Meanwhile, the microcomputer 10 obtains the voltage at the undervoltage detection terminal 10a at intervals of 50 ms. If the microcomputer 10 detects a voltage of 1.0 V or less four consecutive times, it ceases the transmission of the P-ON-H signal via the power supply terminal 10b.

Specifically, the second transistor Q2 is repeatedly forced to route the P-ON-H signal sent via the power supply terminal 10b to a ground in order to stop the power supply circuit 26. An excessive rise in an output voltage is thus suppressed. If the excessive rise in the output voltage continues, the transmission of the P-ON-H signal via the power supply terminal 10b is ceased in order to stop the power supply circuit 26. Consequently, the excessive rise in the output voltage can be prevented.

(3) PROCESS WHICH A MICROCOMPUTER FOLLOWS FOR SUPPRESSING A VOLTAGE RISE

Figure 4:
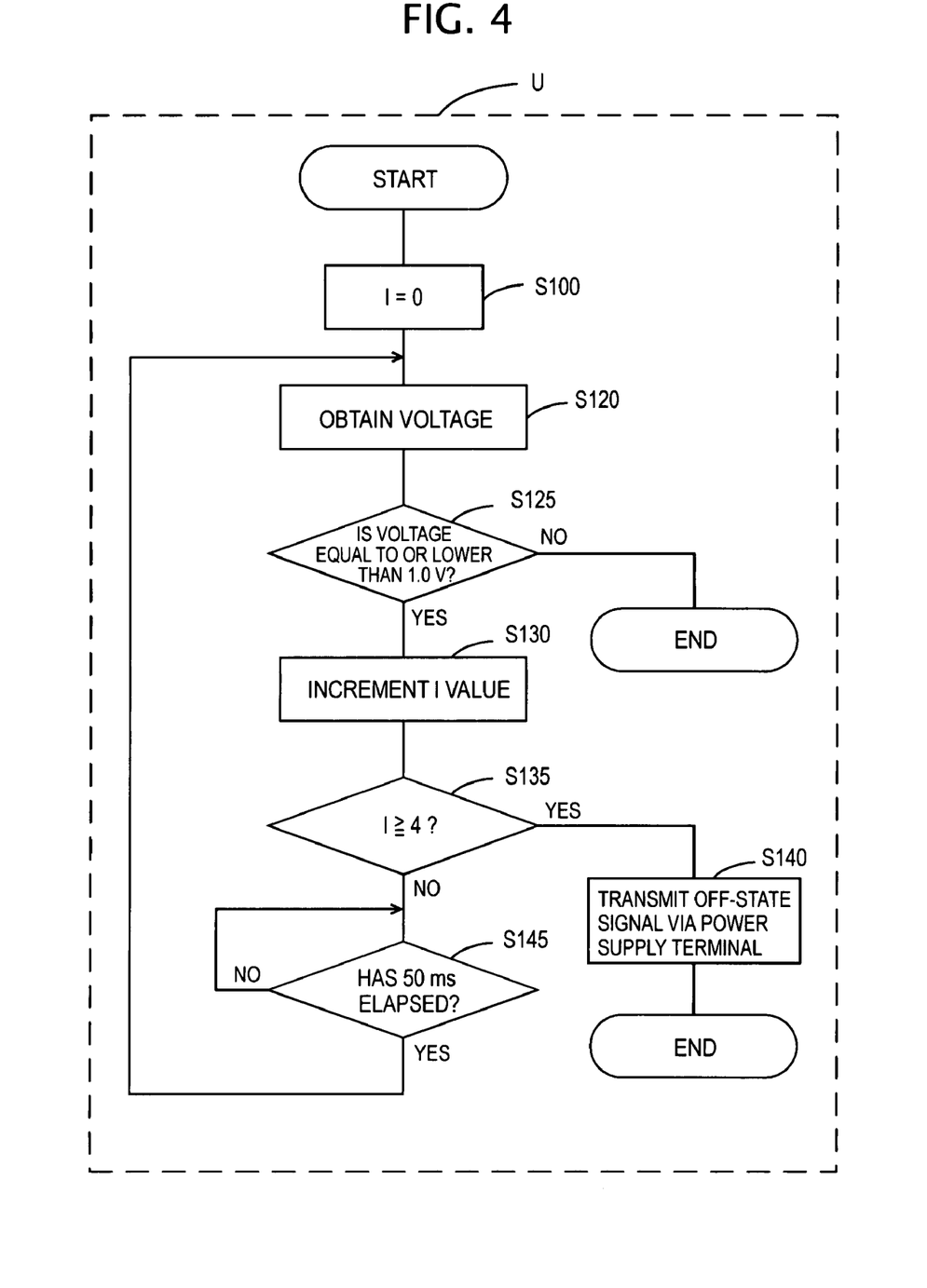
FIG. 4 is a flowchart describing a process which a microcomputer follows for suppressing a rise in a voltage generated by a power supply circuit by controlling the voltage rise suppression circuit.

Next, referring to the timing chart of FIG. 3 and the flowchart of FIG. 4, a description will be made of a process which the microcomputer 10 follows for suppressing a rise in the output voltage 2 of the power supply circuit 26 by controlling the voltage rise suppression circuit 30 having the aforesaid configuration. The process is such that: the microcomputer monitors the voltage output line, on which the output voltage 2 is placed, via the undervoltage detection terminal 10a; if a voltage applied to the undervoltage detection terminal 10a falls below 1.0 V, the microcomputer senses the undervoltage, and decides whether the voltage rise is attributable to an abnormality in the power supply circuit 26. The process is repeatedly executed while the power supply is on.

When the process is initiated, the microcomputer 10 initializes a counter at step S100 and proceeds to step S120.

At step S120, the voltage at the undervoltage detection terminal 10a is obtained and control is passed to step S125. The obtained voltage is checked to see if it is equal to or lower than 1.0 V If the voltage is equal to or lower than 1.0 V, a condition is met and control is passed to step S130. The counter value is incremented and control is passed to step S135. On the other hand, if the obtained voltage is not equal to or lower than 1.0 V, the condition is unmet and the process is terminated.

Specifically, since a voltage is applied to the undervoltage detection terminal 10a over the 3.3 V line, if the first transistor Q1 is off, the voltage at the undervoltage detection terminal Q1 is 3.3 V. If the first transistor is on, since the voltage at the undervoltage detection terminal 10a is routed to a ground via the collector and emitter of the first transistor Q1, the voltage thereat is brought to 0 V. In the present embodiment, 1 V that is an intermediate value between 3.3 V and 0 V is regarded as a threshold, and the voltage at the undervoltage detection terminal 10a is checked to see if it is higher or lower than 1 V. Needless to say, any value between 0 V to 3.3 V can be adopted.

At step S135, the counter value is checked to see if it is equal to or larger than 4. If the counter value is equal to or larger than 4, a condition is met and control is passed to step S140. The transmission of a P-ON-H signal via the power supply terminal 10b is ceased. On the other hand, if the counter value falls below 4, the condition is unmet and control is passed to step S145.

Specifically, if the voltage at the undervoltage detection terminal 10a being equal to or lower than 1.0 V is detected four consecutive times, the transmission of the P-ON-H signal is ceased in order to turn off the power supply Consequently, even if the voltage at the undervoltage detection terminal 10a is temporarily equal to or lower than 1.0 due to noise or the like, the power supply will not be incorrectly turned off. Moreover, although the output voltage 2 keeps rising, the voltage at the undervoltage detection terminal 10a may be 3.3 V depending on the timing of its being obtained by the microcomputer 10. However, when the second transistor Q2 is turned off, since the output voltage 2 is confined to a certain value, the power supply can be turned off without fail by repeating the foregoing process multiple times.

At step S145, a decision is made on whether 50 ms has elapsed since a voltage equal to or lower than 1.0 V is detected at step S125. If 50 ms has elapsed, a condition is met and the process beginning with step S120 is repeated. On the other hand, if 50 ms has not elapsed, the condition is unmet and step S145 is repeated. Specifically, the microcomputer 10 checks the voltage at the undervoltage detection terminal 10a at intervals of 50 ms. Needless to say, the interval between checks may not be 50 ms but may be set to any value.

The microcomputer 10 following the process ranging from step S100 to step S145 serves as a voltage rise suppression unit U that controls the power supply terminal 10b according to the voltage at the undervoltage detection terminal 10a.

(4) CONCLUSION

Included are a Zener diode D2 having a cathode thereof connected onto a voltage output line, dividing resistors having one terminal thereof connected to the anode of the Zener diode D2 and having the other terminal grounded, a transistor Q1 having a base thereof connected to the junction point between the dividing resistors via a resistor and having an emitter thereof grounded, a transistor Q2 having a base thereof connected to the junction point between the dividing resistors and having an emitter thereof grounded, and a microcomputer having an undervoltage detection terminal 10a which is connected to the collector of the transistor Q1 and to which 3.3 V is externally applied, and a power supply terminal 10b which is connected to the collector of the transistor Q2 and via which a P-ON-H signal of 3.3 V that starts a power supply circuit 26 when the power supply is turned on is transmitted. Consequently, there are provided a voltage rise suppression circuit and a panel television capable of fully turning off the power supply while confining an abruptly rising voltage to a certain value.

Needless to say, the present invention is not limited to the aforesaid embodiments. A person with ordinary skill in the art would readily appreciate variances described below as embodiments of the present invention.

A variance in which any of the members or circuit elements disclosed in one the embodiments are appropriately combined with any of those disclosed in the other embodiments and exchangeable with the members or circuit elements.

A variance in which the members or circuit elements disclosed in the embodiments are appropriately exchanged with those disclosed in related arts but not disclosed in the embodiments or appropriately combined with one another.

A variance in which the members or circuit elements disclosed in the embodiments are appropriately exchanged with those thought to be substitutes by a person with ordinary skill in the art but not disclosed in the embodiments, and appropriately combined with one another.

In addition, reference to "first," "second," "third," and etc. members throughout the disclosure (and in particular, claims) is not used to show a serial or numerical limitation but instead is used to distinguish or identify the various members of the group.

What is claimed is:

1. A panel television that includes a voltage rise suppression circuit that suppresses an excessive rise in an output voltage under a control of a microcomputer that monitors a voltage output line of a flyback power supply circuit, and that displays a picture on a flat panel display according to a television signal while being supplied a supply voltage from the flyback power supply circuit, comprising:

the flyback power supply circuit is controlled based on a feedback signal that is fed back over the voltage output line;

the voltage rise suppression circuit includes: a first Zener diode having a cathode coupled with the voltage output line and having an anode that is grounded; a second Zener diode having a cathode coupled with the voltage output line; dividing resistors having one terminal coupled with an anode of the second Zener diode and having the other terminal grounded; a first transistor having a base coupled with a junction point between the dividing resistors via a first resistor and having an emitter that is grounded; a second transistor having a base coupled with the junction point between the dividing resistors via a second resistor and having an emitter that is grounded; and a microcomputer having an undervoltage detection terminal that is connected to a collector of the first transistor and to which a fixed voltage is externally applied and a power supply terminal that is connected to a collector of the second transistor and via which a P-ON-H signal that starts the flyback power supply circuit when the power supply is turned on is transmitted;

when the output voltage rises, a Zener current flows through the second Zener diode, a voltage is developed at the junction point, and the voltage is applied to the bases of the first and second transistors respectively; the first and second transistors are turned on; the voltage at the undervoltage detection terminal is routed to a ground, and the P-ON-H signal to be sent to the flyback power supply circuit via the power supply terminal is also routed to the ground; the power supply circuit stops and the output voltage drops; when the output voltage drops to fall within a normal range, the Zener current does not flow through the second Zener diode any longer; the first and second transistors are turned off, and the undervoltage detection terminal and power supply terminal are not grounded any longer; and the P-ON-H signal sent via the power supply terminal reaches the flyback power supply circuit to start the power supply circuit; and the microcomputer obtains the voltage at the undervoltage detection terminal at intervals of a predetermined number of times;

and when the microcomputer detects a voltage equal to or lower than a predetermined voltage plurality of consecutive times, the microcomputer ceases the transmission of the P-ON-H signal via the power supply terminal.

2. A voltage rise suppression circuit that suppresses an excessive rise in an output voltage by monitoring a voltage output line of a flyback power supply circuit, comprising:

a Zener diode that has a cathode coupled with the voltage output line and that undergoes a Zener breakdown when an output on the voltage output line exceeds a predetermined value;

dividing resistors having one terminal coupled with an anode of the Zener diode and having the other terminal that is grounded;

a first transistor having a base coupled with a junction point between the dividing resistors and having an emitter that is grounded;

an undervoltage detection terminal connected to a collector of the first transistor;

a power supply terminal through which a voltage signal that starts the flyback power supply circuit is transmitted;

a second transistor having a base coupled with the junction point between the dividing resistors, having an emitter that is grounded, and having a collector coupled the power supply terminal; and a voltage rise suppression unit that controls the power supply terminal according to the voltage at the undervoltage detection terminal.

3. The voltage rise suppression circuit according to claim 2, wherein the voltage output line is a line over which a voltage to be monitored is fed back in order to control the power supply circuit.

4. The voltage rise suppression circuit according to claim 2, wherein the voltage rise suppression unit senses a drop in a voltage applied to the undervoltage detection terminal and controls a signal to be transmitted via the power supply terminal.

5. The voltage rise suppression circuit according to claim 2, wherein: the voltage rise suppression unit detects the voltage applied to the undervoltage detection terminal at intervals of a predetermined time; and when the voltage rise suppression unit senses the voltage being lower than the predetermined voltage a predetermined number of times, the voltage rise suppression unit ceases the transmission of the signal via the power supply terminal so as to stop the power supply circuit.

* * * * *